United States Patent Office 2,964,452
Patented Dec. 13, 1960

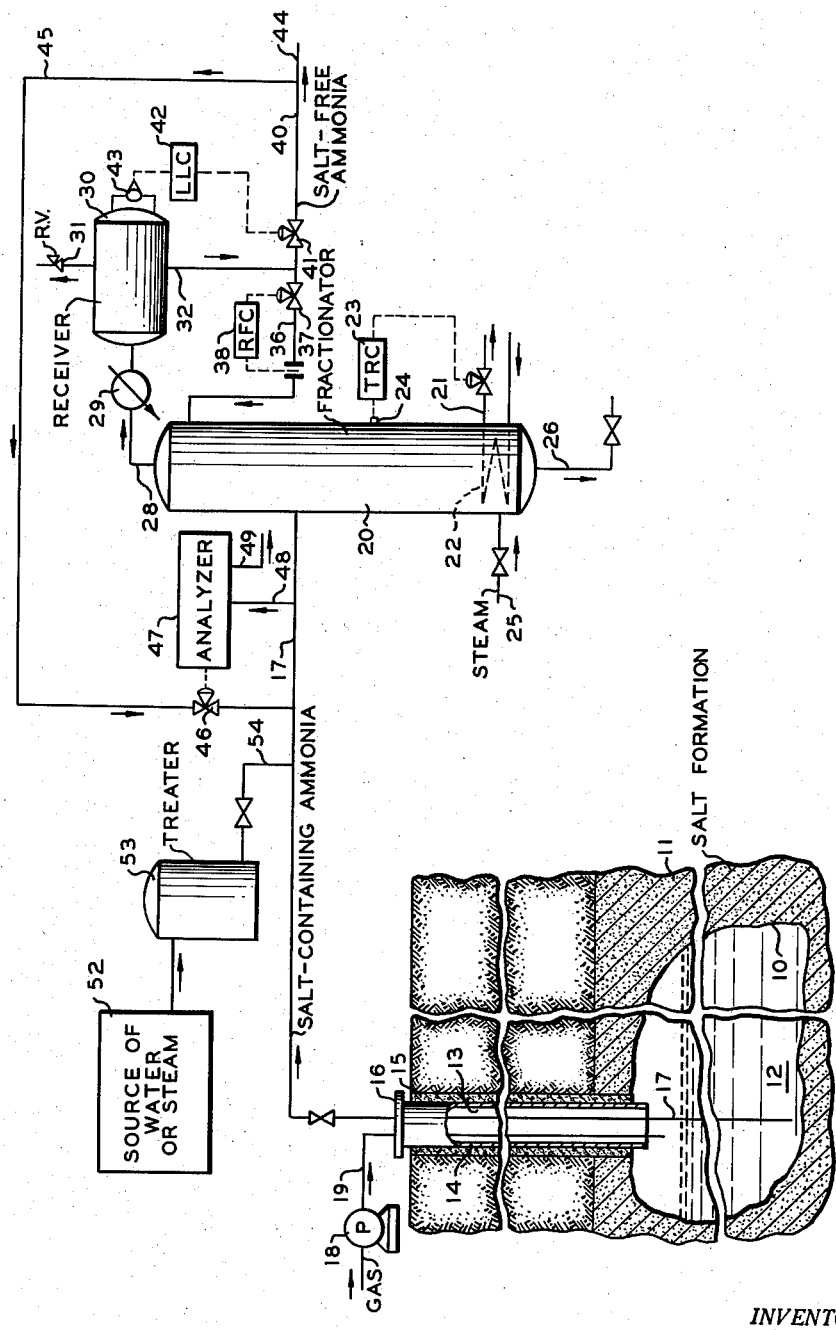

2,964,452

AMMONIA STORAGE AND RECOVERY SYSTEM

William G. Morrison and Byron T. Brown, Phillips, Tex., assignors to Phillips Petroleum Company, a corporation of Delaware Filed July 25, 1955, Ser. No. 524,237

4 Claims. (Cl. 202—39)

This invention relates to a method of and system for separating ammonia from dissolved salts contained therein. In another aspect, it relates to a system for the storage of ammonia in an underground cavern formed in a salt formation, and recovery of the stored ammonia in a substantially anhydrous condition.

With the increasing cost of surface storage facilities for fluid material, particularly ammonia, various methods of storing such fluids underground have been proposed which will afford more economic storage than surface equipment. One of the most economical systems for underground storage of ammonia involves the formation of underground cavern in a salt bed, since the cavern can be formed by dissolving the salt with water, and the cavern, when formed, is quite stable and free from water seepage.

However, it has been found that the stored ammonia dissolves salt and, particularly in the earlier stages of product withdrawal, the recovered stream contains substantial quantities of water. Thus, the withdrawn material has a typical composition of 10 to 45 weight percent ammonia, 15 to 30 weight percent salt (calculated as sodium chloride) and the remainder water. When such a material is fractionated, it has been observed that foaming and flooding of the fractionation column occurs at frequent intervals. Indeed, because of these conditions, it was frequently necessary to put the fractionator on total reflux when such foaming or flooding occurred until operations became stable again and the chloride content of the overhead product was reduced to below a predetermined value.

In accordance with this invention, anhydrous ammonia product is added to this feed to provide a stream containing 60 to 85 weight percent ammonia, and 2 to 15 weight percent salt. Also, if necessary, sufficient water is added to adjust the salt-water solution on an ammonia-free basis to 85 to 95 percent of saturation.

Under these conditions, the fractionation is carried out without any tendency toward flooding or foaming of the fractionator. Further, the reflux to overhead product ratio can be reduced from 0.9–2 to 1 to 0.4–0.8 to 1 for the column. Further, the column can operate at full capacity for as long a period as desired without interruptions due to foaming or flooding.

Accordingly, it is an object of the invention to provide an improved system for the storage of ammonia in salt caverns and the recovery of ammonia therefrom.

It is a further object to provide a fractionation system for a water-salt-ammonia feed which can operate for long periods of time without interruptions due to foaming or flooding.

It is a still further object to provide a system wherein a minimum of units is required for the separation, and the units are of an inexpensive type so that the installation can be located closely adjacent a storage zone.

Various other objects, advantages and features of the invention will become apparent from the following detailed description taken in conjunction with the accompanying drawing, in which the single figure is a schematic flow diagram of an ammonia storage system constructed in accordance with the invention.

Referring now to the figure, we have shown an underground cavern 10 formed in a subterranean salt formation 11, this cavern containing a body 12 of stored ammonia. The cavern 10 communicates with the surface through a shaft 13 in which is mounted a liner 14 secured in place by a mass of cement 15. At the surface, the liner 14 is sealed by a well head 16, the ammonia being withdrawn through a valved line 17 extending to a position close to the bottom of the cavern by gas introduced into the upper part of the cavern by a pump 18 and a line 19. This gas can be overhead product from the ammonia distillation tower hereinafter described or "purge" gas from a plant using a catalytic ammonia process. Ammonia to be stored can be pumped into the cavern by unit 18 or, alternatively, it can flow into the cavern by gravity through the line 17.

A certain amount of salt is dissolved in the ammonia in the cavern and, particularly in the initial stages of operation, the withdrawn product has a composition of 10–45 weight percent ammonia, 15–30 weight percent salt (sodium chloride) and the remainder water.

The product withdrawn from storage is fed through the line 17 to a fractionation column 20 wherein suitable conditions are maintained for the separation. These conditions can be a top temperature of 96° F., a kettle temperature of 381° F., a pressure of 185 to 189 pounds per square inch gage for a feed containing 28.9 weight percent ammonia, 16.9 weight percent salt and 54.2 weight percent water. Fractionator 20 can be suitably provided with 14 to 20 bubble cap trays with a tray spacing of 24 inches. In a small installation, where the feed rate, for example, is 5.5 gallons per hour, a 6-inch by 28 foot 5-inch column packed with ⅜-inch Raschig rings can be used. The foregoing temperature can be conveniently maintained by circulating steam at a pressure of 200 pounds per square inch gage through a valved line 21 and a reboiler coil 22 at a sufficient rate as to provide 16.3 pounds per hour of condensate, the steam rate being under the control of a temperature recorder controller 23 having a sensing element 24 in the fractionation column.

Under the aforementioned conditions, stripping steam can be introduced through a line 25 at a rate of 67.3 pounds per hour at a pressure of 197 pounds per square inch gage and a temperature of 629° F. The amount of stripping steam, of course, will vary widely with different sizes of column, feed rates and changes in other operating variables. A bottoms product is recovered through a line 26 containing 0.8 weight percent ammonia, 7.4 weight percent salt and 91.8 weight percent water at a rate of 12.0 gallons per hour, and a top product is withdrawn at a temperature of 94° F. and a pressure of 185 pounds per square inch gage which passes through a condenser 29 to an overhead accumulator 30 having a vent 31. Material is withdrawn from the accumulator 30 by a line 32 and a suitable reflux to the column is provided by a reflux line 36 incorporating a motor valve 37 controlled by a rate of flow controller 38 having a sensing device in the line 36 downstream of the valve 37. In the typical installation described, the reflux rate can be 6.6 gallons per hour of 99.9 weight percent ammonia containing less than 10 parts per million of chloride ion.

The remainder of the product leaving the accumulator 30 passes through a line 40 under the control of a motor valve 41 which, in turn, is connected to a liquid level controller 42 having a sensing element 43 in the accumulator 30. In the specific example described, the flow rate through line 40 is 12.6 gallons per hour of which 2.5 gallons per hour is sent to a product storage zone through a line 44.

In accordance with the invention, the remainder of the overhead product is passed through a line 45 incorporating a motor valve 46 to the feed inlet line 17. The rate of flow is such as to provide, after admixture with the product withdrawn from cavern 12, a feed to the fractionator 20 containing 60 to 85 weight percent ammonia and 2 to 15 percent salt. In the specific examples described, motor valve 46 is regulated by an analyzer 47 having a sensing element 48 in line 17 so as to provide a feed to the fractionator having a composition of 67.1 weight percent ammonia, 6.8 weight percent salt and 26.1 weight percent water, the feed entering at a flow rate of 15.5 gallons per hour.

To this end, a sample is withdrawn from line 17 and passed through a sample pipe 48 to the analyzer from which the sample stream is withdrawn by a line 49. The analyzer 47 can be a specific gravity recorder controller, a refractometer sensitive to the proportion of ammonia in the feed stream, or other suitable analytical instrument providing an output representative of the ammonia concentration in the feed. In this fashion, the ammonia content of the feed is maintained within the limits of 60 to 85 weight percent with resultant elimination of flooding and foaming in the fractionation column. Also, the addition of ammonia in the manner stated permits the reflux-to-overhead product ratio to be reduced to 0.4–0.8:1 from 0.9–2:1.

The operation is facilitated, and flooding or foaming further minimized by providing a water content in the feed of 80–95 percent of saturation of the salt-water solution on an ammonia-free basis. To this end, we have shown a source 52 of water through which a stream is fed through a treater 53 to remove unwanted ions and a valved line 54 to the feed line 17. In this manner, the water content of the feed to the fraactionation column 20 is adjusted to a value within the stated range.

While the invention has been described in connection with a present, preferred embodiment thereof, it is to be understood that this description is illustrative only and is not intended to limit the invention.

We claim:

1. The method of recovering anhydrous ammonia from a stream containing 10–45 weight percent ammonia, 15–30 weight percent salt comprising sodium chloride and the balance water which comprises adding sufficient ammonia and water to said stream to provide a feed containing 60–85 weight percent ammonia, 2 to 15 weight percent salt and sufficient water to provide a salt-water solution on an ammonia-free basis which is 80–95 percent saturated, introducing said feed into a fractionation zone, supplying heat to the bottom of said fractionation zone and withdrawing heat from the top thereof to separate an overhead product of anhydrous ammonia and a salt-water bottoms product, whereby the fractionation zone is operated on a continuous basis without foaming or flooding.

2. The method of recovering anhydrous ammonia from a stream containing 10–45 weight percent ammonia, 15–30 weight percent salt comprising sodium chloride and the remainder water which comprises adding ammonia to said stream to provide a feed stream containing 60–85 weight percent ammonia, 2 to 15 weight percent salt and the balance water, fractionating said feed stream to separate substantially anhydrous ammonia from the salt water, and recovering anhydrous ammonia from the fractionation zone.

3. The method of recovering anhydrous ammonia from a stream containing 10–45 weight percent ammonia, 15–30 weight percent salt comprising sodium chloride and the remainder water which comprises adding ammonia to said stream to provide a feed stream containing 60–85 weight percent ammonia, 2 to 15 weight percent salt and the balance water, fractionating said feed stream to separate substantially anhydrous ammonia from the salt water, returning a portion of said overhead product to the feed stream as said added ammonia, and recovering the rest of said anhydrous ammonia as a product.

4. The method of recovering anhydrous ammonia from a stream containing 10–45 weight percent ammonia, 15–30 weight percent salt comprising sodium chloride and the remainder water which comprises adding ammonia to said stream to provide a feed stream containing 60–85 weight percent ammonia, 2 to 15 weight percent salt and the balance water, introducing added water to said feed stream to provide a stream which is 80–95 percent saturated with salt on an ammonia-free basis, fractionating said feed stream to separate substantially anhydrous ammonia from the salt water, and recovering anhydrous ammonia from the fractionation zone.

References Cited in the file of this patent

UNITED STATES PATENTS

| | | |
|---|---|---|
| 2,012,621 | Bennett | Aug. 27, 1935 |
| 2,061,810 | Shiffler | Nov. 24, 1936 |
| 2,444,175 | Teter et al. | June 29, 1948 |
| 2,445,255 | Younkin | July 13, 1948 |
| 2,580,651 | Boyd | Jan. 1, 1952 |
| 2,709,678 | Berger | May 31, 1955 |
| 2,713,775 | Cottle | July 26, 1955 |
| 2,732,334 | Pullock | Jan. 24, 1956 |

FOREIGN PATENTS

| | | |
|---|---|---|
| 903,448 | Germany | Feb. 8, 1954 |

OTHER REFERENCES

Wilson et al.: "Coal Coke and Coal Chemicals," 1950, pages 308–309.